United States Patent [19]
Kaplan et al.

[11] Patent Number: 5,524,066
[45] Date of Patent: Jun. 4, 1996

[54] TEXT RECOGNITION BY PREDICTIVE COMPOSED SHAPES

[75] Inventors: Ronald M. Kaplan; Daniel G. Bobrow, both of Palo Alto, Calif.

[73] Assignee: Xerox Corporation, Stamford, Conn.

[21] Appl. No.: 220,861

[22] Filed: Mar. 31, 1994

[51] Int. Cl.⁶ .................................................. G06K 9/72
[52] U.S. Cl. ...................... 382/229; 382/226; 382/228; 382/200
[58] Field of Search .................................. 382/40, 38, 39, 382/25, 14, 15, 36, 37, 226, 227, 228, 229, 200, 119, 230

[56] References Cited

U.S. PATENT DOCUMENTS

| | | | |
|---|---|---|---|
| 4,654,875 | 3/1987 | Srihari et al. | 382/229 |
| 5,029,223 | 7/1991 | Fujisaki | 382/226 |
| 5,067,165 | 11/1991 | Nishida | 382/226 |
| 5,133,023 | 7/1992 | Bokser | 382/40 |
| 5,151,950 | 9/1992 | Hullender | 382/40 |
| 5,329,598 | 7/1994 | Geist | 382/40 |
| 5,377,281 | 12/1994 | Ballard et al. | 382/40 |
| 5,392,212 | 2/1995 | Geist | 382/229 |

*Primary Examiner*—Leo Boudreau
*Assistant Examiner*—David R. Anderson
*Attorney, Agent, or Firm*—Oliff & Berridge

[57] ABSTRACT

A top-down technique for character text recognition of an image comprises a left-to-right analysis of each image line. A current image portion is selected. Possible text prefixes are selected from a dictionary. The upper and lower text contours of the text prefixes are compared with a bitmap of the current image portion. A distance value is generated, indicating the quality of the comparison. The prefixes are then added to an agenda of prefixes. Based on the distance value, corresponding to the similarity of the upper shapes and lower shapes of the possible prefix to the bitmap of the image portion, a list of the text prefixes generating the best distance values is selected from the agenda. From the selected list, a new list of extended text prefixes is obtained from the dictionary and added to the agenda. The process is repeated until the current image portion ends. At this point, the possible text prefix having the best total distance value is selected as the list of text characters corresponding to the image portion. The total distance value is the sum of all of the distance values of the text characters forming the text prefix. Possible text words are selected from the agenda based on beam searching techniques against either a threshold or by limiting the number of possible text prefixes selected to a predetermined number of the currently most probable text prefixes.

14 Claims, 11 Drawing Sheets

TEXT RECOGNITION BY PREDICTIVE COMPOSED SHAPES

BACKGROUND OF THE INVENTION

1. Field of the Invention

This invention relates to text recognition of text images using a top-down analysis of an image and possibly corresponding text words. In particular, this invention relates to a piece-wise left-to-right analysis of an image on a line-by-line basis and the possibly corresponding text prefixes and words. The analysis uses a left-to-right piece-wise concatenation of the individual image segments and of the corresponding upper and lower contours of selected text prefixes and/or text words. The possibly corresponding text prefixes and words are selected based on previous comparisons between the text image and the upper and lower image contours of the previous possible text prefixes.

2. Related Art

Traditionally, text recognition techniques, such as those used in optical character recognition, have proceeded from a bottom-up orientation. That is, traditional techniques first identify individual pixels, then join these pixels into connected components or strokes. Then, the connected components or strokes are mapped onto characters. The higher level units such as words then appear merely as a sequence of previously recognized characters. However, these traditional techniques invariably experience well-known inaccuracies and inefficiencies due to the difficulties of isolating and identifying strokes or connected components and the ambiguous way in which the ambiguously determined strokes or connected components map onto the character sequences.

While the accuracy of these traditional techniques can be improved by filtering the intermediate results of the recognition process against a dictionary of known words, this improved accuracy is achieved only at a further increase in the inefficiency of the recognition process, in terms of time and processing power required.

In contrast to the traditional bottom-up text recognition techniques, a partially top-down technique has recently been proposed. In this partially top-down technique, the recognition process proceeds from an analysis of the overall outline of an individual word. In this approach, the inter-word spacing is used to first distinguish between individual words. The shape class of a word, as defined by its relative length, its distribution of ascenders and descenders and its distribution of angular versus rounded contours, is analyzed and determined, rather than the details of the particular letter strokes or connected components which form the word. In this way, the text recognition process avoids having to analyze the details of the strokes or connected components, which are often extremely noisy and difficult to correctly isolate.

This known technique is a partially top-down technique because it continues to use standard bottom-up processes such as locating interword spaces. By including such bottom-up processes, this known technique retains the inefficiencies in bottom-up techniques involved in identifying such interword spaces. That is, the noise associated with identifying components or strokes can also affect the process of identifying interword spaces, which may vary in size. In addition, a small interword space may be recognized as an intraword space, while a large intraword space may be recognized as an interword space. Thus, by trying to determine the interword spaces in a bottom-up, a priori manner, the known inefficiencies and inaccuracies in bottom-up techniques are reintroduced in this known, partially top-down technique.

In this partially top-down technique, the shape contour of each of a dictionary of words is matched against a shape contour generated from a bitmap image of the text word to be recognized. In this known approach, the recognition process matches the generated image word shape separately against a text word shape for each text word contained in the dictionary. Unfortunately this itself introduces several typical inefficiencies into the recognition process.

First, the amount of computation is linear, relative to the size of the dictionary. Thus, the computational cost is prohibitive for any reasonably-sized dictionary (for example 100,000 words).

Second, the amount of memory storage necessary to store the word contours corresponding to each of the words in the dictionary for even a reasonably-sized dictionary is itself extremely large.

Finally, because the shape of each text word as a whole is compared against the shape of each image word as a whole, image words having shapes which deviate in systematic ways from the model shapes of the text words in the dictionary, such as stretching, shrinking or tilting, significantly interferes with the reliability of the matching process. Accordingly, while this partially top-down approach provides a more robust text recognition process relative to the known problems of noisy and difficult to isolate strokes or connected components, the top-down approach itself has areas lacking robustness. Further, while the partially top-down approach is able to avoid the inefficiencies arising from analyzing strokes or connected components, it magnifies the inefficiencies arising out of the use of dictionaries of known words. Finally, the memory requirements of this known partially top-down approach raise the cost of a top-down system to prohibitive levels.

SUMMARY OF THE INVENTION

Accordingly, this invention provides a text recognition system and method using a more completely top-down approach which avoids the memory requirements of the known partial approaches and provides for increased robustness in view of image shaped deviations.

In particular, this invention provides for a text recognition system and method which separately analyzes the shape contour of each character or symbol of a line of an image separately.

This invention further provides for a text recognition system and method which separately analyzes the upper contour shape and lower contour shape of the image line.

This invention provides these features by performing an element-wise left-to-right comparison of a current image portion of a current image line against the upper and lower shape contours corresponding to a list of possible text prefixes or words. The list of possible text prefixes or words is selected from the dictionary based on the quality of the comparison corresponding to previously identified or selected text prefixes. The analysis is performed by comparing the bitmap of the current image portion against the upper and lower shaped contours of each one of the list of possible text prefixes or words.

Because the concatenation of two or more symbols and their corresponding upper and lower shapes is equivalent to the sequence of symbols taken as a whole and the upper and lower shapes of the whole sequence, the comparison of the image portions with the text prefixes can proceed on a piecewise basis by concatenating a next image portion of the current line of the image with the current image portion of the current image line. Likewise, the list of new text prefixes and their corresponding upper and lower contours can be created by concatenating various new text characters and their corresponding upper and lower contours with each previous text prefix and its corresponding upper and lower contours. Thus, the analysis can proceed on a piecewise basis, avoiding the need to completely regenerate the upper and lower contours for each new text prefix.

A distance value is generated from the comparison to indicate the degree of matching between the current image portion and each one of the list of possible text prefixes. Then, a list of selected prefixes, comprising either a predetermined number of possible text prefixes or all possible text words falling below a predetermined distance value threshold, is selected from an agenda of all possible text prefixes, based on the distance value of the text prefixes. Once the left-to-right element-wise comparison detects the end of a current line or a current word, a single text string or text word is selected, from the list of possible text prefixes based on the total distance values generated, as the text string or text word corresponding to the current image lines or image portion.

BRIEF DESCRIPTION OF THE DRAWINGS

The preferred embodiments of this invention will be described in detail with respect to the following drawings in which like reference numerals indicate like elements and wherein.

DETAILED DESCRIPTION OF THE PREFERRED EMBODIMENTS

Figure 1A:
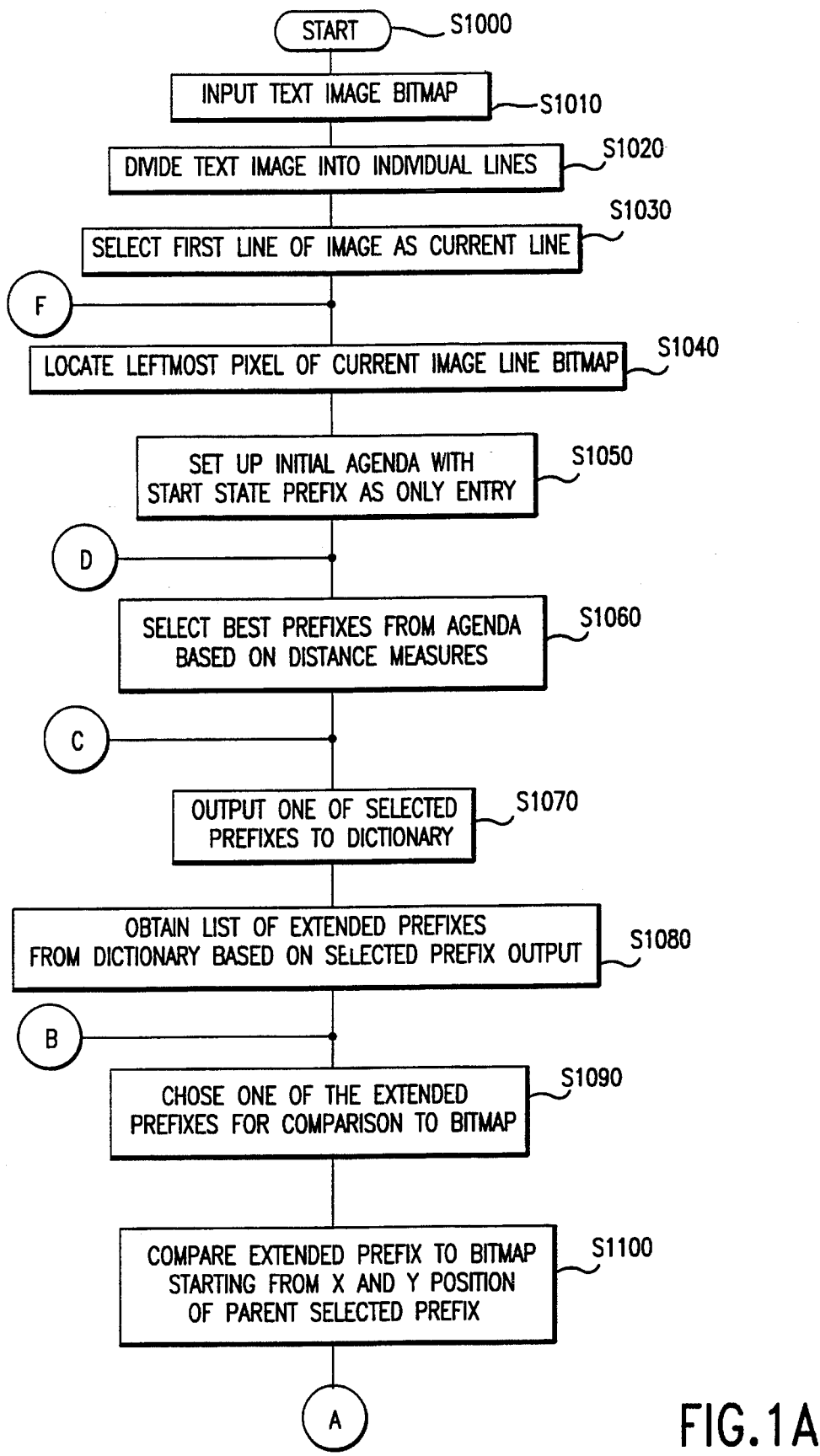
FIG. 1A–1C shows a flowchart of the operation of a first embodiment of the image analyzing system.

A three-tape finite-state-machine provides a valid basis for coding the information from a dictionary of words into a dictionary storage unit based on the following observation. The known methods for contour shape representation of characters are homomorphic over concatenation. That is, if x and y are two strings of letters, and xy is their concatenation, then the following equation holds:

$$Shape(xy)=Shape(x).Shape(y)$$

where the period denotes a simple operation for combining two shape representations. As indicated above, the shape for each letter or letter string can be broken down into two components, an upper shape (US) and a lower-shape (LS). The concatenation homomorphism therefore holds for both of these components. Thus, in general taking sets of triples, where each triple contains a letter string, its upper shape and its lower shape, the following relation holds:

$$< xy, US(xy), LS(xy) > \; = \; < xy, US(x).US(y), LS(x).LS(y) >$$
$$= \; < x, US(x), LS(x) >.< y, US(y), LS(y) >$$

where the period in the second line is defined as an element-wise concatenation operator of the components of its operand triplets.

It is well-known in the art that, if the relation between the strings of a language and their shaped components US and LS is in a particular mathematical class, the class of "regular 3-relations", then this relation can be generated or accepted by a particularly simple computational device, the three-tape finite-state-machine. As is also well known in the art, the three-tape finite-state-machine can be encoded as a left-to-right state-transition graph. The edges of the state-transition graph are labeled with the triples of an individual letter and its corresponding upper and lower shapes, US and LS. Therefore, any valid word of the dictionary can be encoded as a path, or sequence of edges, between the various nodes in such a state-transition graph. With any such path, the word encoded by the path can be read out simply by concatenating the first components of the labels of the edges forming the path.

In addition, there are well-known techniques for constructing such a state-transition graph from a dictionary of words and a table which specifies the shape contours of the individual letters. Of course, it should be understood that the table of shape contours is highly dependent upon the particular font to be used, but the comparison of the upper and lower character shapes is generally insensitive to stretching, scaling or tilting. Finally, various well known techniques exist in the art for reducing the size of such state-transition graphs and for optimizing the left-to-right matching performance. One such optimizing technique comprises determinizing the graph on one or more coordinates. Finally, one of the inventors has developed highly effective techniques for encoding such state-transition graphs in relatively small amounts of memory space. These techniques are set forth in copending U.S. patent application Ser. No. 07/855,129 to Kaplan et al., now U.S. Pat. No. 5,450,598, incorporated herein.

Thus, as set forth above, all possible word shape correspondences have been represented in an optimized three-tape finite-state-machine to provide this compact decoding. This three-tape finite-state-machine is then used to directly govern the matching candidates for the top-down, or in this case, left-to-right word-predictive, text recognition system of the present invention.

A first preferred embodiment of the method is shown in FIG. 1. For each current image line, recognition begins by inputting, in step S1010, the image bitmap. Then, in step S1020, the individual lines of the image are identified. In step S1030, the first line of the image is selected as the current line. Next, in step S1040, the left-most pixel of the bitmap of the current line is located.

Next, in step S1050, the system accesses a start state of the 3-tape finite-state-machine representing the dictionary. The transitions from the start state correspond to the possible letters or other symbols that can begin words. In the examples shown and described herein, the dictionary is assumed to be a standard, English-language dictionary. However, depending on the type of document, the dictionary can be in another language, or can be limited to the specialized language and jargon of a technical discipline. In limited dictionaries, not every possible character of the alphabet used to represent words will begin words or phrases in the dictionary. Therefore, every character may not be represented by a transition from the start state.

The letters will form the initial, one-symbol prefixes. A prefix is a string of words and/or a word fragment that can form, when combined with other characters, one or more words in the dictionary. As the number of characters in the prefix grows, the prefix is defined by the characters corresponding to the path of edges, or transitions, taken through the finite state machine. Thus, the prefix is interchangeable with its path. Similarly, the entries in the dictionary, which may be single words or multiword phrases, are each represented as a unique set of transitions (i.e. a unique transition path) of the finite state machine. Each set of transitions defining a word or phrase entry begins from and ends to the start state. That is, the first transition path, defining the first letter of the dictionary entry, extends from the start state, while the last transition path, defining the space between the current dictionary entry and the next, extends to the start state. It should be appreciated that every "space" transition does not return to the start state. This is because some dictionary entries comprise more than one independent word.

The start state is used to create an initial entry in the agenda. Each entry of the agenda has four parts. The first part is the current state. The second part is a list of the characters forming the prefix. This corresponds to the list of state transitions from the start state through the 3-tape finite-state-machine to the current state. The third part is the distance measure, which indicates the quality of the comparison of the contours of the prefix to the current image line or portion. The fourth part is the x and y positions of the bitmap of the text image being analyzed which generate the 'best' distance measure. Then, in step S1060, the best current agenda entries are selected. Since, in the first pass-through the agenda for each line, the agenda has only one entry, that entry is of course selected and removed from the agenda, In step S1070, one of the prefixes selected in step S1060 is output to the dictionary as the current selected prefix.

In step S1080, the transitions or extended prefixes extending from the current state are obtained from the dictionary. Then, in step S1090, one of the transitions extending from the current state of the prefix output to the dictionary is selected as a current transition. For the initial prefixes extending from the start state, all of these extended prefixes have the same distance measure. This is the initial distance measure assigned when the agenda was first created, and represents a perfect match.

Next, in step S1100, the pair of upper and lower contours of the chosen transition is matched against the bitmap of the current line beginning at the x and y positions stored in the fourth part of the chosen agenda entry, All of the one-character prefixes extending from the start state are matched at the starting x and y positions, corresponding to the leftmost pixel of the bitmap of the current image line. The "leftmost" pixel can be the actual leftmost pixel, independent of its vertical position in the line. However, in the preferred embodiment, the leftmost" pixel is on the baseline of the line of text.

As the pair of upper and lower contours of the chosen transition is matched to the bitmap, starting from the stored x and y positions (i.e., the starting x and y positions), a new set of x and y positions (i.e., the ending x and y positions) along the bitmap is located. The new set of ending x and y positions represents the point along the bitmap that maximizes the fit between the pair of upper and lower contours of the chosen transition and the bitmap. At the same time, the distance measure, a value representing the quality of the fit (either in terms of goodness or badness) between the bitmap and the contours of the chosen transition, is determined. In step S1110, the distance measure is generated from the fit between the bitmap and the contours of the chosen transition. In step S1120, the extended prefix, along with the new state, distance measure, and x and y positions, is stored to the agenda. Then, in step S1130, the system determines if all of the transitions for the current selected prefix have been compared to the bitmap. If so, control continues to step S1140. If all of the transitions of the current prefix have not been compared, control returns to step S1090. In step S1140, the system determines if every selected prefix or agenda entry has been output to the dictionary. If so, the system continues to step S1150. Otherwise, the system returns to step S1070 where another selected prefix is chosen and output to the dictionary.

In a variation of the first preferred embodiment (and usable with all of the following embodiments) of this invention, the upper contour and the lower contour are independently matched to the bitmap and generate separate x and y positions. That is, the matching process is first performed for the upper contour to generate an upper contour distance measure and upper contour best-fit (or ending) x and y positions. This process is then repeated for the lower contour of the current character of the set of valid current characters. Then, in this variation, two values, independently representing the quality of fit between the bitmap and the upper and lower contours, are combined in step S1110 to get a single quality measure or distance measure for each possible path.

In another variation, an offset $\epsilon$ is determined between the upper and lower contours of the bitmap. This offset $\epsilon$ represents any warping of the characters, such as in printed italic characters. This offset is then added to the x and y positions, as appropriate, for either the upper or lower contour, as appropriate, to improve the alignment between the appropriate contour and the bitmap. For example, in a straight, italicized line of text, the offset $\epsilon$ would be added to each upper contour from the best fit x position determined from the previous fitting operation. This way, the best fit position is not itself altered, so that if the warping stops or starts during a line, the offset has not been permanently incorporated into the best fit position.

As discussed above, each agenda entry, or prefix, is stored as a list of state transitions defining one or more words. That is, the length of a prefix is not limited to a single word.

In step 1150, the system determines if any of the agenda entries has reached the end of the current line. If not, control returns to step S1060. Otherwise, control continues to step S1160.

Then, in step S1060, the agenda, or complete list of possible paths for the current image line, is searched to obtain a limited number of possible paths, or prefixes, to be further pursued. That is, based on the distance measures and either a distance measure threshold or on a predetermined number of paths to be selected, only the most probable ones of the prefixes are selected from the agenda for further analysis.

In step S1070, the selected paths are output one at a time to the dictionary to obtain new extended prefixes. The new extended prefixes obtained from each selected prefix are defined by the new transitions extending from the state at the end of the last transition of the selected prefix. That is, each selected prefix is used to obtain a new set of transitions, or current characters, from the dictionary. The new set of transitions extend from the ending state of the parent prefix. The new set of transitions thus defines a new set of valid extended prefixes. The new set of valid extended prefixes includes those characters which, when concatenated with the selected paths or prefixes, also form a valid prefix.

In step S1090, the extended prefixes, formed by concatenating the current characters of each selected prefix with that selected prefix in step S1080, are chosen one at a time for comparison against the bitmap. When the extended prefixes are formed, they inherit the list of characters forming the prefix from their parent prefix, as well as the starting distance measure and the starting x and y positions from the ending distance measures and ending x and y positions of the parent prefix. Then, in step S1100, the chosen extended prefix is compared to the bitmap from the starting x and y positions to determine the best-fit ending x and y positions and the current distance measure. Since each chosen prefix has its own particular set of x and y positions, each chosen prefix containing the same current character will match that current character's contours to the bitmap starting from a different set of x and y positions. Thus, the new set of x and y positions for each new valid prefix containing that current character will be different for each such prefix.

In step S1120, the new distance measure for the chosen prefix is determined by adding the current distance measure generated in step S1110 to the starting distance measure for the chosen prefix. In step S1120, the current extended prefix is stored to the agenda. Then, in step S1130, the system again determines if all of the extended prefixes have been chosen. If not, the system returns to step S1090, where another extended prefix is chosen. If all of the extended prefixes have been chosen, the system continues to step S1140. In step S1140, the system again determines if all of the selected prefixes have been output. If not, the system returns to step S1070 where another selected prefix is output to the dictionary. If all of the selected prefixes have been output in step S1150, the system again determines if any prefix has reached the end of the current line.

It should be appreciated that, in this first preferred embodiment, which avoids using any bottom-up techniques, the interword spaces are treated as just another character. Thus, the paths, or prefixes, of the agenda are not divided into word segments during the analysis process. Rather, the prefix includes all of the characters of the line.

If the system determines, in step S1150, that the end of the current line is reached, the system continues to step S1160, where the prefix of the agenda having the best distance measure is output as the text string corresponding to the current image line. Then, in step S1170, the system determines if a next image line exists. If so, the system continues to step S1180 where the next image line is selected, then returns to step S1040. If no further image lines exist, the system branches instead to step S1190, where the process is ended.

If step S1150 determines that the end of the current image line has not been reached, the system returns to step S1060. It should be appreciated that as the agenda is searched for the best fitting prefixes after each pass through step S1060–S1150, the newly selected list of "best" prefixes may include prefixes which were not included in the previously selected list of best prefixes. However, since each prefix of the agenda carries with it the best-fit x and y positions for the upper and lower contours, as a prefix of the agenda dropped from the selected list of prefixes, no information is lost and the system can easily restart the analysis from these best-fit x and y positions at any time during the analysis of the current image line.

Figure 2A:
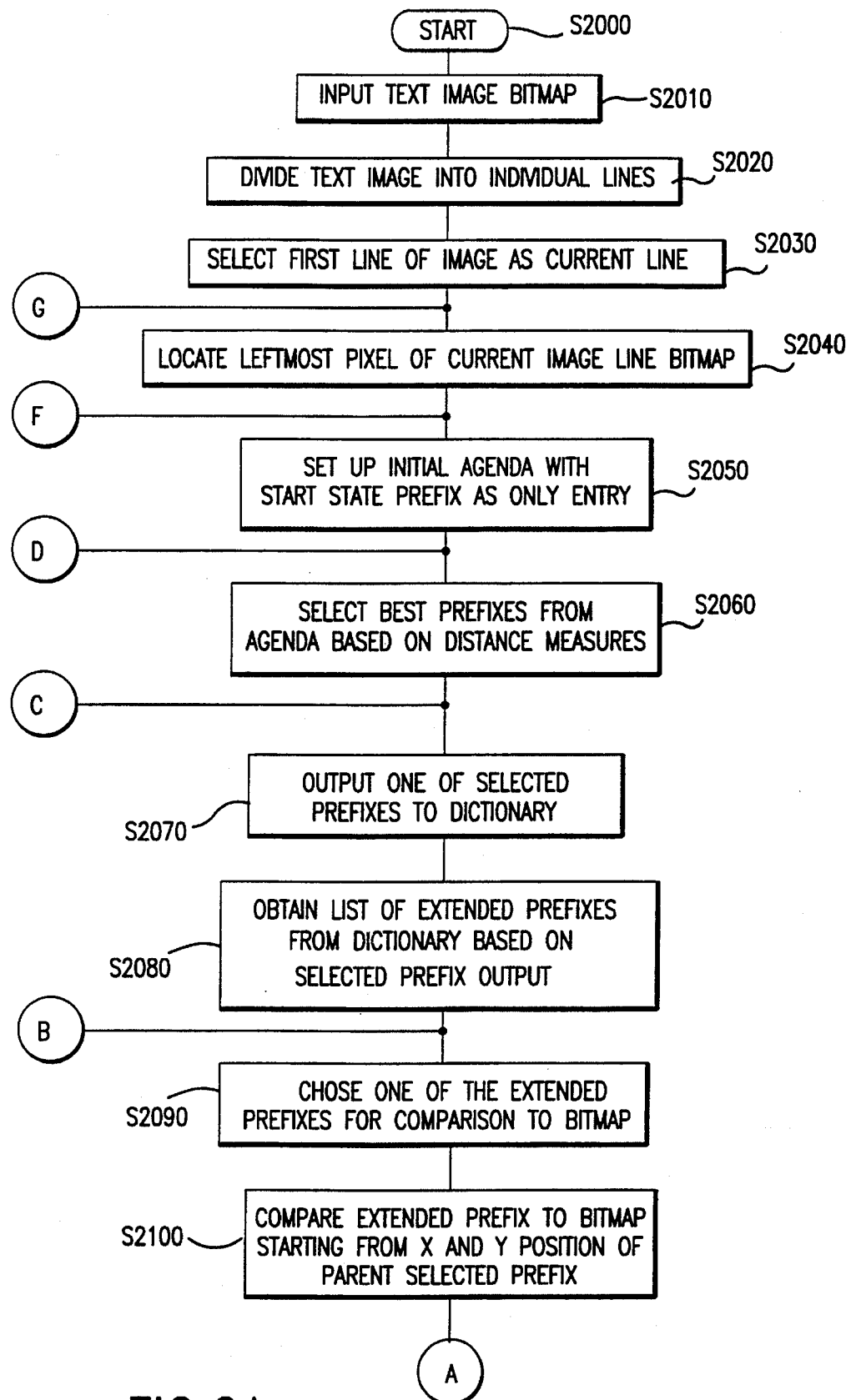
FIG. 2A–2C shows a flowchart of the operation of a second embodiment of the image analyzing system.
Figure 2B:
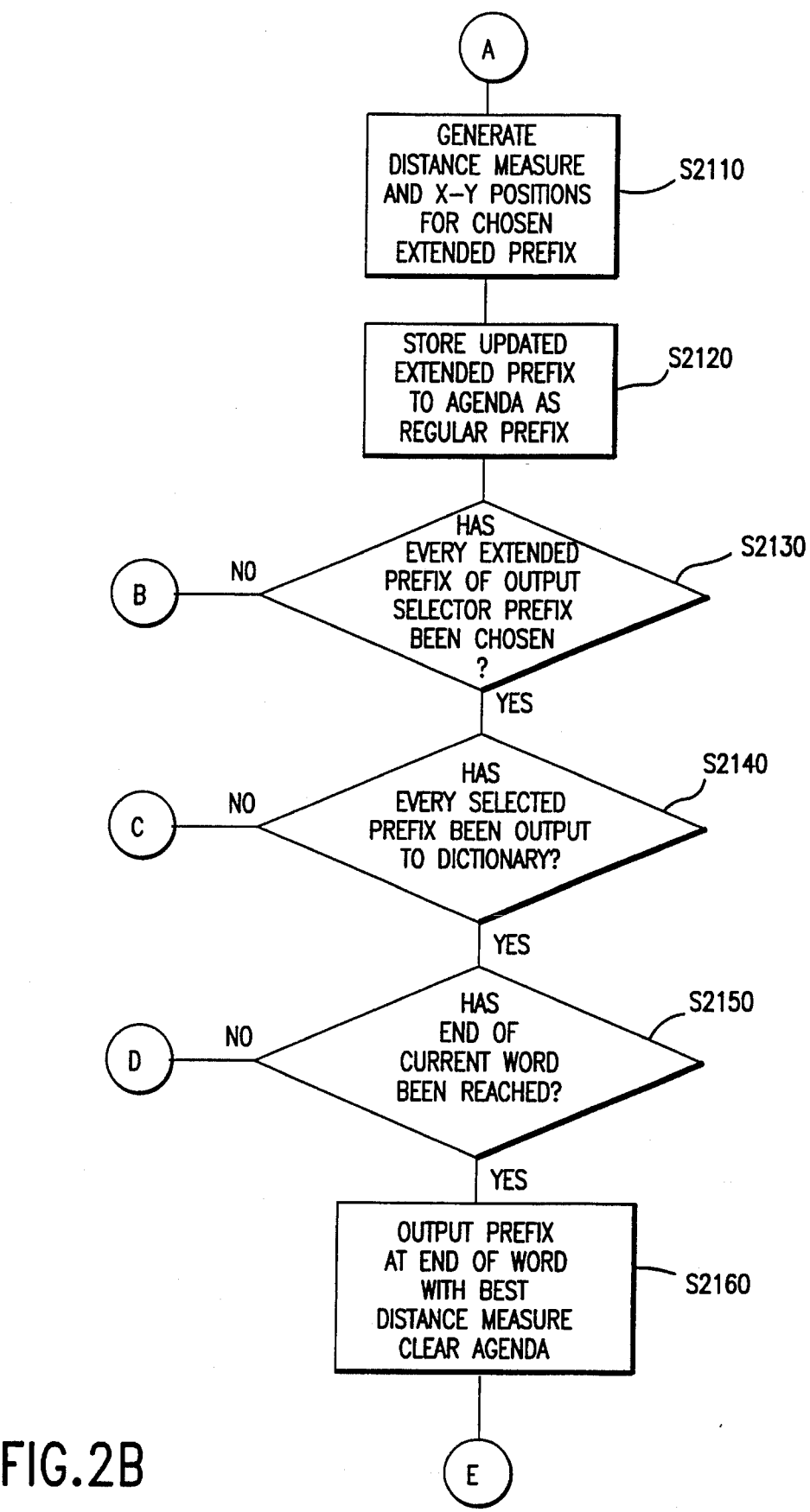
Figure 2C:
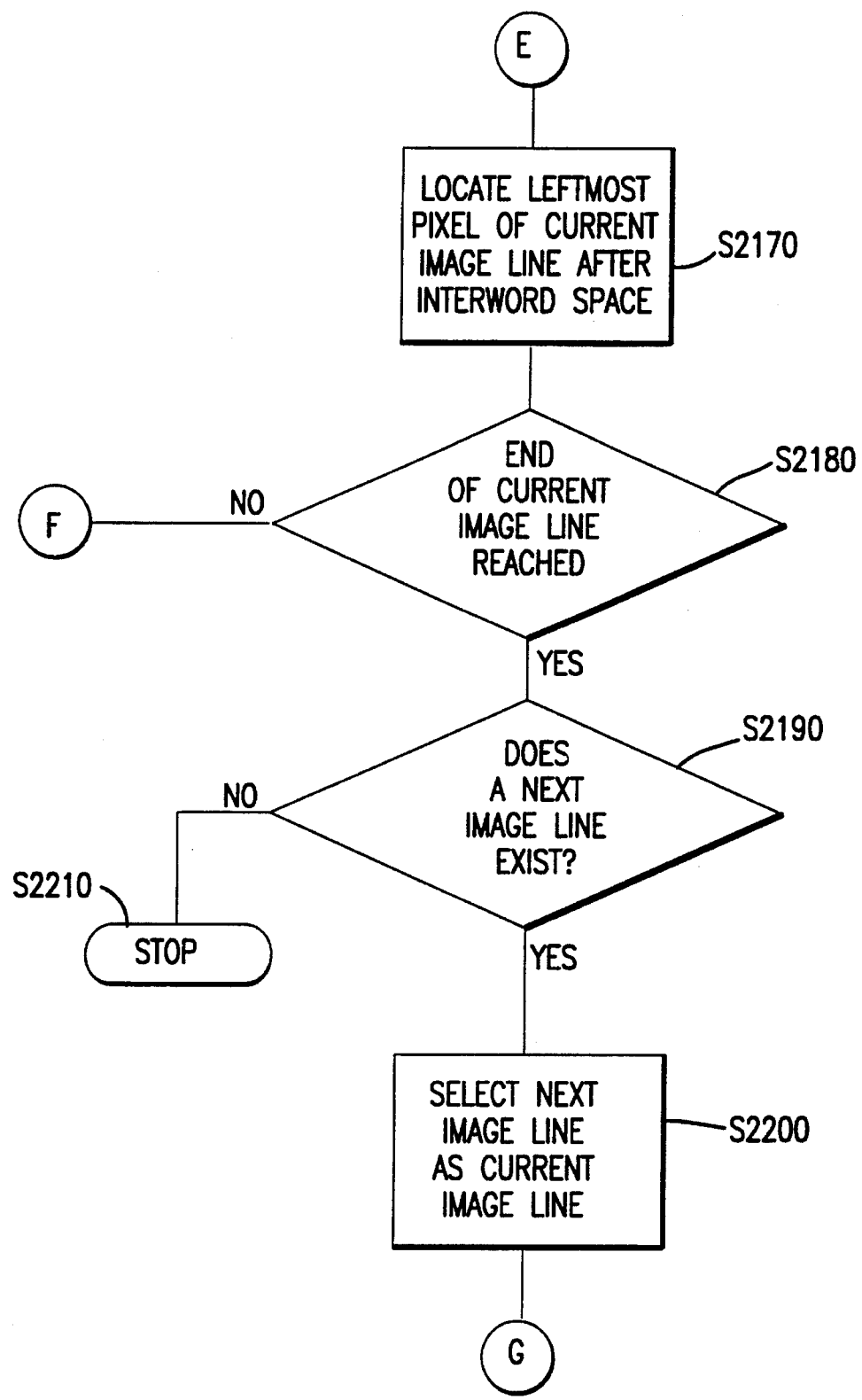

In a second preferred embodiment, the system instead immediately reacts to the interword spaces. Thus, in the second preferred embodiment, as shown in FIGS. 2A–2C; steps S2000–S2140 are the same as in the first preferred embodiment. Then, in step S2150, the system determines if the end of the current image word is reached, by determining if the best-fit prefix ends in an interword space. If not, the system returns to step 2060. On the other hand, if the best-fit prefix does end in an interword space, the system outputs the prefix as a portion of the text of the current line and clears the agenda in step S2160, and finds the leftmost pixel of the bitmap after the interword space in step S2170.

In step S2180, the system determines if the end of the current image line is reached. If not, the system returns to step S2040, using the x and y positions of the leftmost pixel found in step S2170 as the initial x and y positions. If the system determines the current image line is finished in step S2180, the system continues to step S2190, where it determines if a next image line exists. If so, the system continues to step S2200, where the next image line is selected, then returns to step S2040. If not, the system continues to step S2210, where the process stops.

This second preferred embodiment modifies the pure top-down system of the first preferred embodiment to incorporate the bottom-up technique of locating interword spaces and treating them as interword spaces. It should also be appreciated that various other bottom-up techniques can be incorporated into the top down system of the first preferred embodiment or the partially top-down system of the second preferred embodiment of this invention. For example, in a third preferred embodiment, contours of the bit map can be generated, and these contours used to "prescreen" the list of extended prefixes output from the dictionary in steps S1110 and S2110 prior to comparing the extended prefixes to the bitmap.

Thus, for example, if the contours of the image line indicate the presence of an ascender or a descender at a certain x and y position of the current image line, the list of valid dictionary words (or alternately the list of valid prefixes) can be prescreened prior to the bitmap matching step to eliminate any otherwise valid words (or prefixes) which do not contain a character having an ascender or descender near the correct location.

In a fourth preferred embodiment, which can also incorporate the bottom-up technique of the third preferred embodiment, other bottom-up techniques, such as pre-locating the interword spaces and the intraword spaces to isolated segments of the current image line, prior to beginning the top-down method of this invention, can be used. However, incorporating these bottom-up techniques ultimately reduces the robustness of the top-down technique of this invention.

Figure 1B:
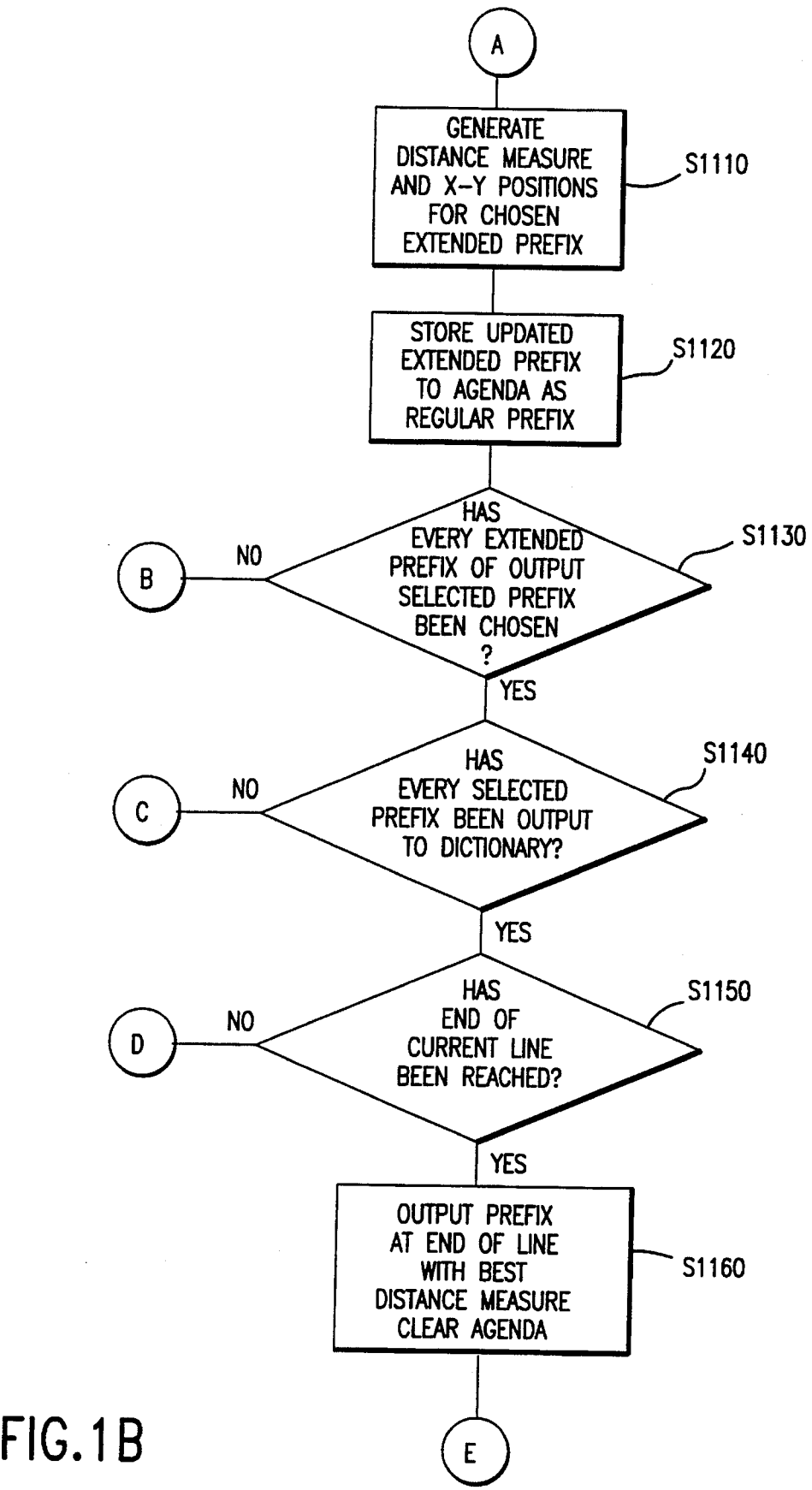
Figure 1C:
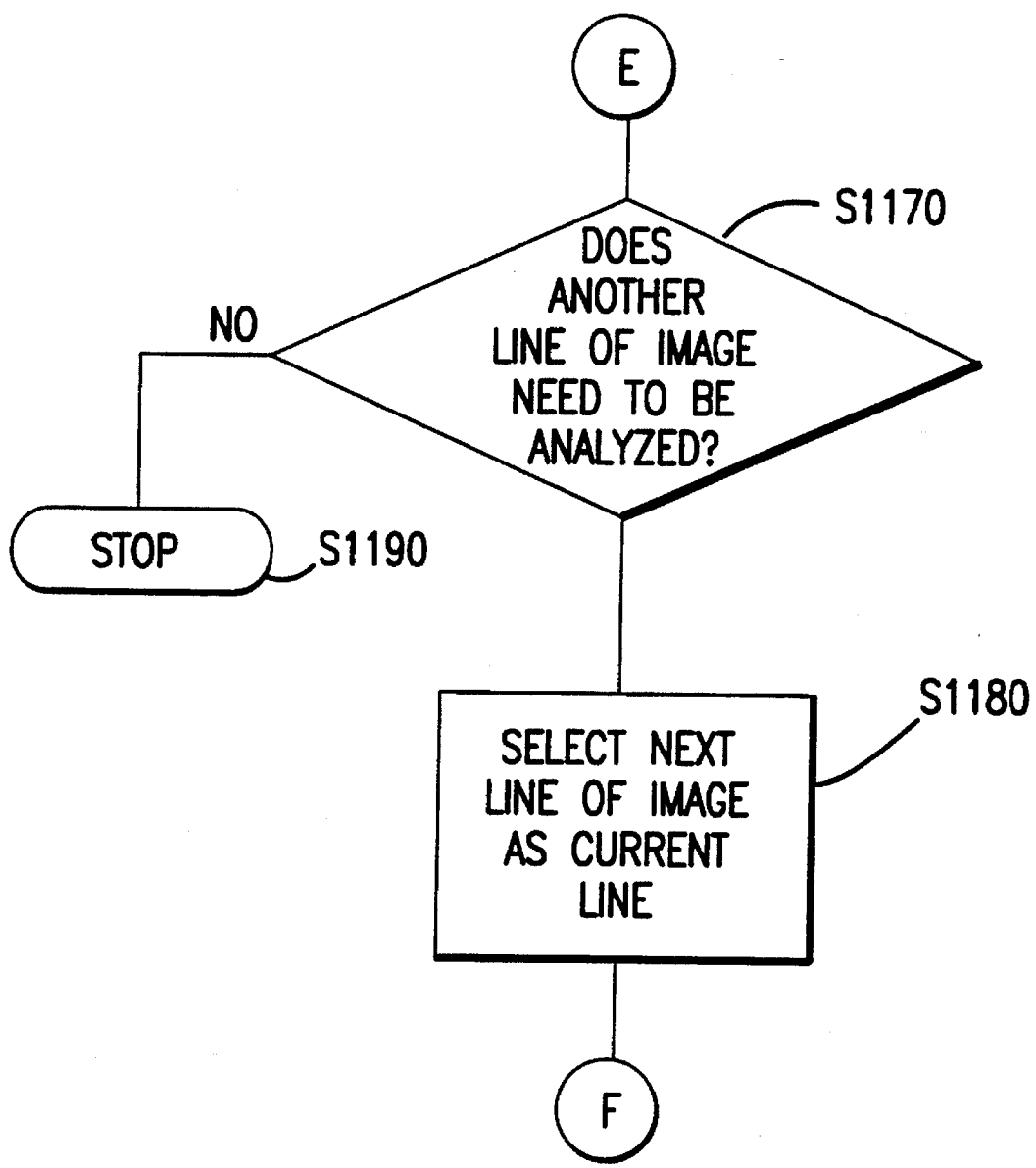
Figure 3:
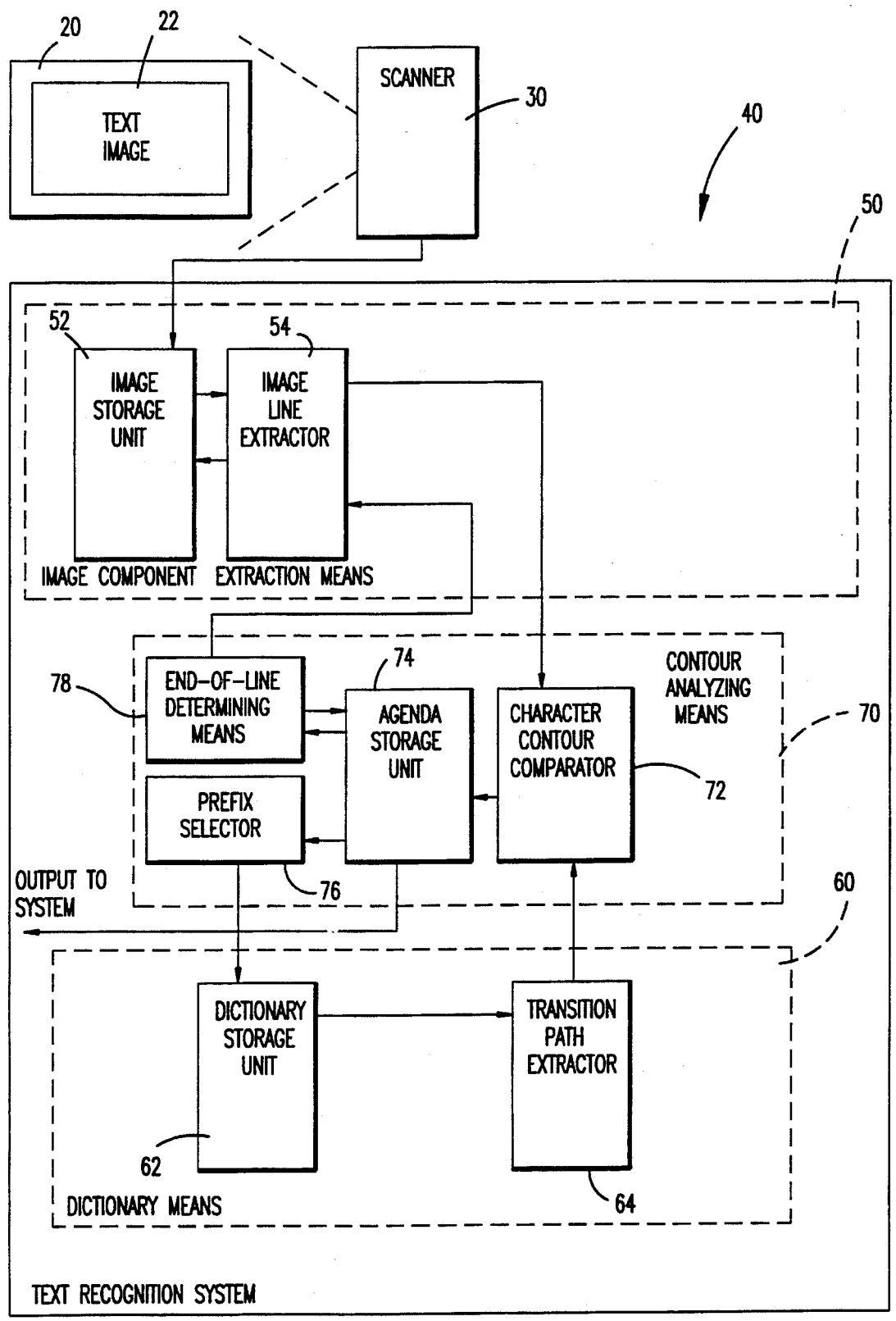
FIG. 3 is a block diagram of the first and second preferred embodiments of the image analyzing system.

FIG. 3 shows a schematic diagram for an image analyzing system which operates according to the first preferred method of the present invention set forth in FIGS. 1A–1C. As shown in FIG. 3, an image bearing member, such as a sheet of paper, a photograph or the like carries an image 22. The image 22 comprises one or more vertically-aligned and horizontally-extending lines of text. Each line of text is separated from the immediately adjacent upper and lower lines of text by a blank space, known as an interline space. Each line comprises one or more words. The leftmost word is aligned at the leftmost position of the corresponding line. Each subsequent word is separated from the immediately left and right adjacent words by an interword space. Each word comprises one or more characters or symbols. Each character may be separated from the left and right characters of the corresponding word by an intraword space. In general, the interline space for any one image is independent of the interline space for another image. Likewise, for each line of text of an image, the interword space for one line is independent of the interword space for the other lines and is often independent of other interword spaces within the current line. Finally, for each word in a line, the intraword spacing within one word is generally independent of the intraword spacing for other words of the line and is itself highly variable. For these reasons, in the first preferred embodiment, these bottom-up features are not relied upon.

The image 22 on the page 20 is scanned by the scanner 30. The scanner 30 uses known techniques and devices, such as charge coupled devices or the like, to convert the text image 22 to a scanned image 22'. The scanned image 22' comprises a multitude of dark or light pixels corresponding to the dark and light portions of the text image 22 sensed by the scanner 30. Because the scanner 30 does not have infinite resolution and cannot perfectly distinguish between the light and dark portions of the text image 22, the scanned image 22' will be noisy. That is, some pixels which should be white will be colored black, and vice versa.

Figure 4A:
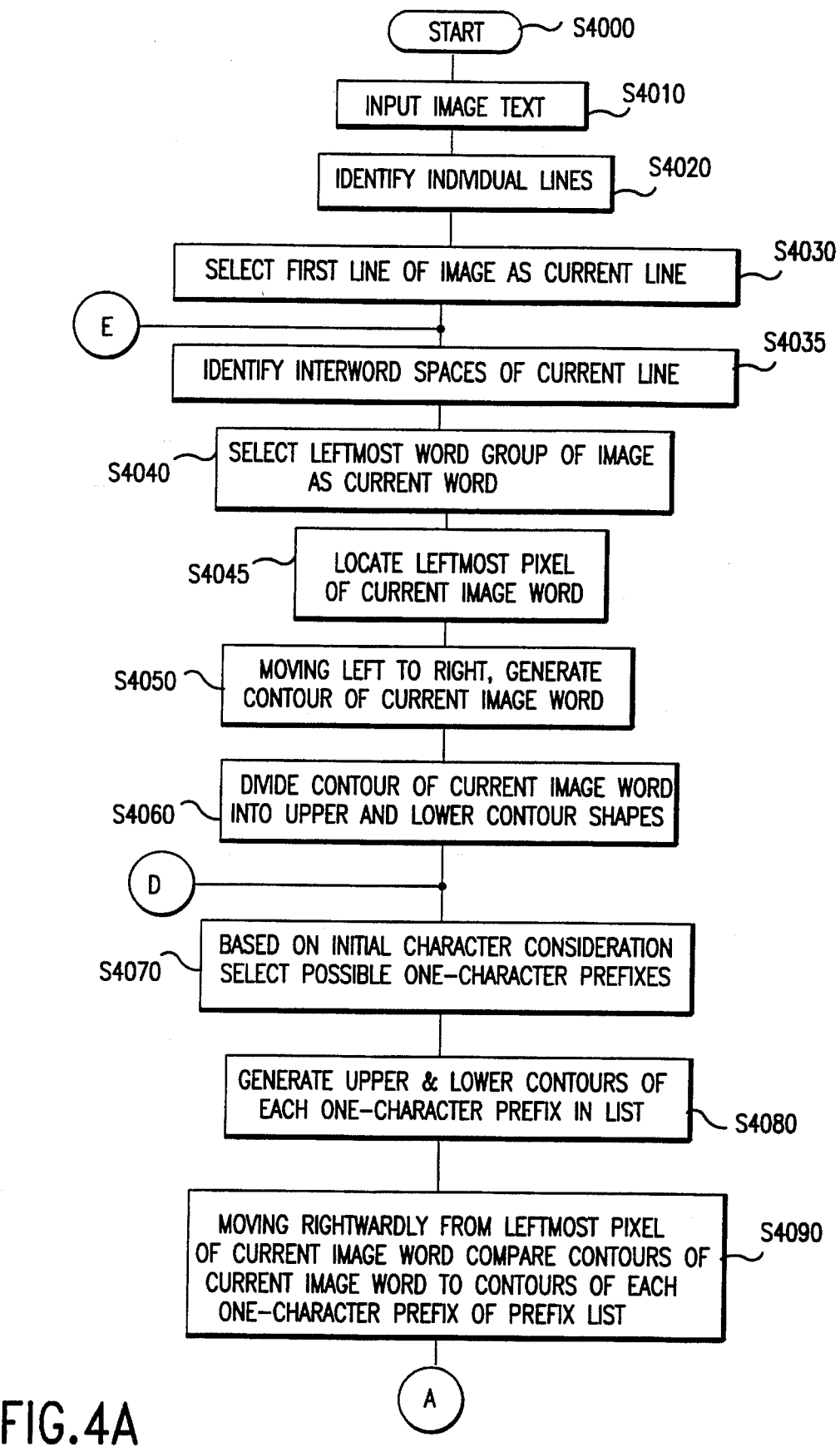
FIG. 4A–4C is a flowchart of the operation of the third and fourth preferred embodiments of the image analyzing system.
Figure 4B:
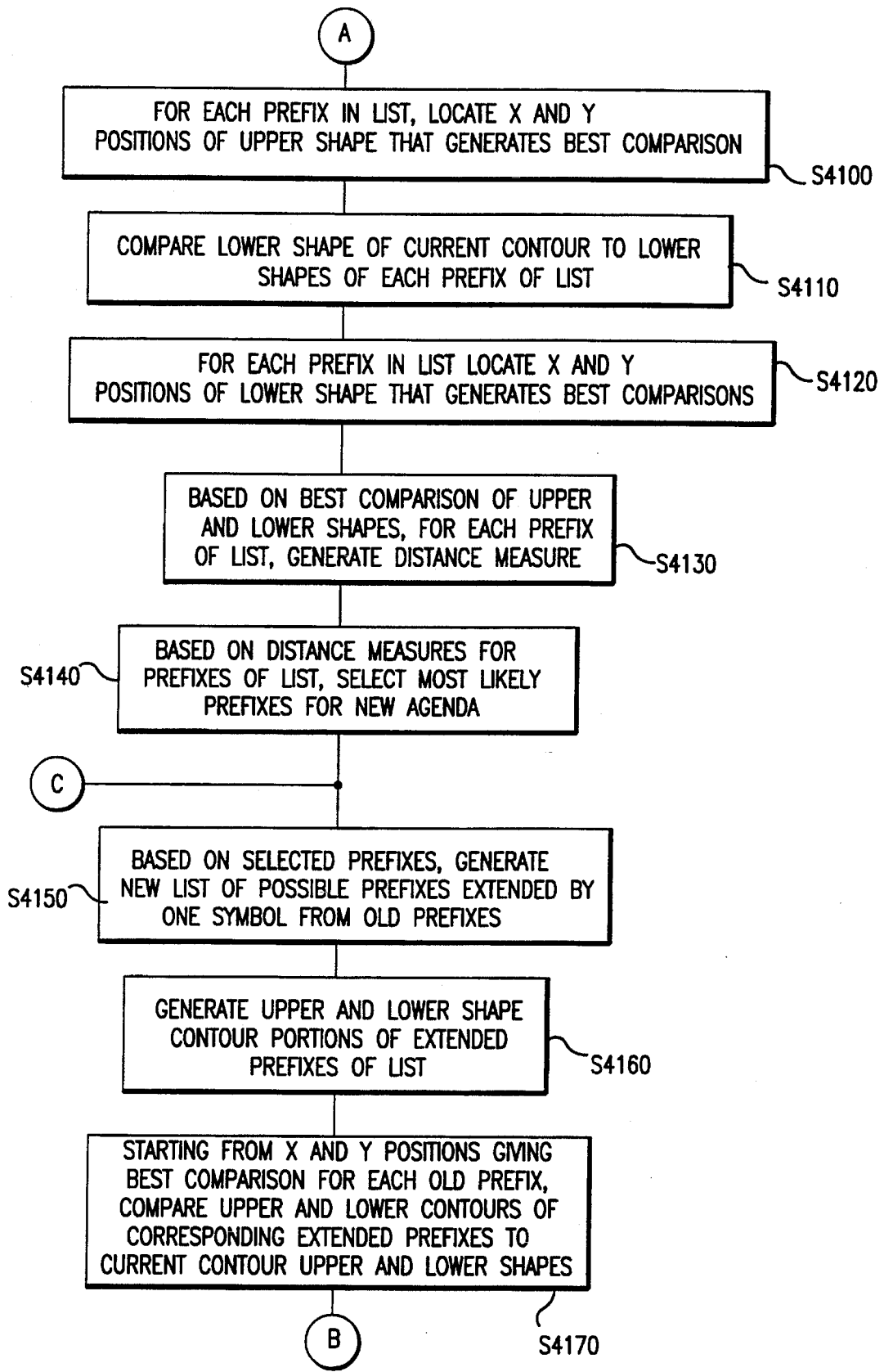
Figure 4C:
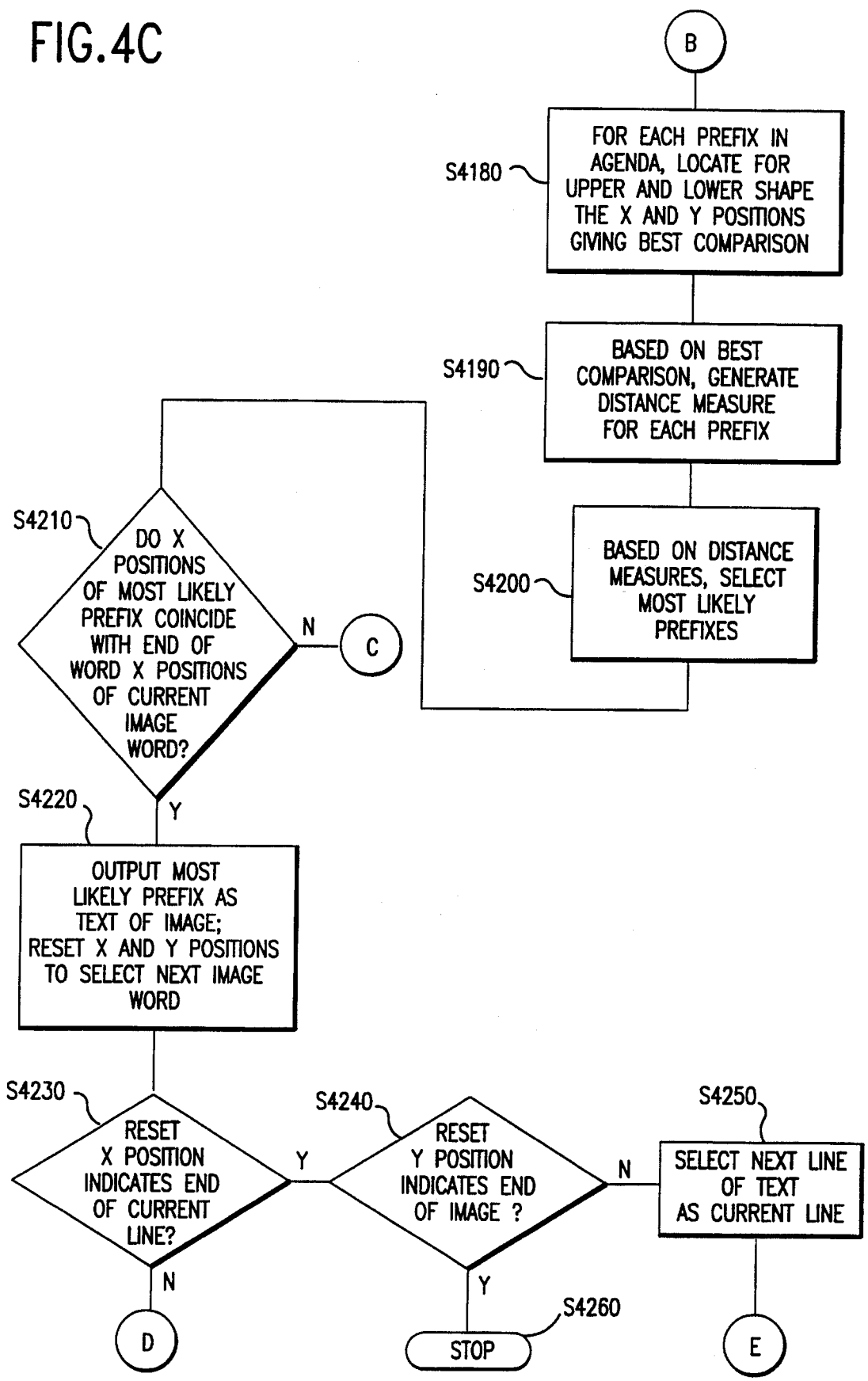

The scanned image 22' is output by the scanner 30 to the text recognition system 40. Specifically, the scanned image 22' is output to an image storage unit 52 of an image component extractor 50. The image component extractor 50 comprises an image line extractor 54, which locates the individual lines of the scanned image 22' stored in the image storage unit 52. In the third and/or fourth embodiments, the image feature extractor may include additional components, as described below and shown in FIG. 4. The image line extractor 54 then extracts a first image line of the image line(s) making up the scanned image 22'. After the first image line has been fully analyzed, the image line extractor 54 extracts a second line, if it exists, from the scanned image 22' and so on until the entire scanned image 22' has been analyzed.

At the same time, a dictionary means 60 comprising the 3-tape finite-state-machine provides the contour analyzing means 70 with the list of current extended text prefixes and their corresponding upper and lower contours. The dictionary means 60 comprises a dictionary storage unit 62 which stores all of the possible words of a language or a vocabulary (a limited subset of a language).

The dictionary means 60 also comprises a dictionary transition path extractor 64. The transition path extractor 64 extracts the new transitions, extending from the ending states of the selected prefixes, from the dictionary storage unit 62. As set forth above, a text prefix is a word or word fragment comprising one or more characters. The term "prefix" is used to indicate that the text characters, so far determined to correspond to analyzed image portions of the current line, do not necessarily correspond to a single or complete word. For example, if the text characters "b" and "a" and "r" have been previously determined to correspond to a current image portion of the current line, then the next prefixes extending from "bar" will include the prefix "bar" and one of following symbols: " " (interword space); "d", "e", "f", "g", "i", "k", "l", "m", "n", "o", "q", "r", "t", and "y".

The transition path extractor 64 outputs the extended prefixes, including the new prefix triples, one at a time to the contour analyzing means 70. Each triple comprises a transition path corresponding to a current character which, when concatenated with its parent prefix, forms another valid prefix, and the corresponding upper contour and the corresponding lower contour.

As each extended prefix is output to the contour analyzing means 70, it is input to the comparator 72. The comparator 72 of the contour analyzing means 70 then compares, one at a time, a portion of the bitmap to the upper and lower contours of each extended prefix. For each comparison, the portion of the bitmap is defined by the starting x and y positions of the extended prefix, which were inherited from the parent prefix. Since each parent prefix will usually give rise to several extended prefixes, the same portion of the bitmap will be compared to several sets of upper and lower contours. Likewise, since several parent prefixes will have child prefixes with the same new ending character, the same set of upper and lower contours will be compared to several different portions of the bitmap.

The comparator 72 does not have to compare the entire upper and lower contour for each possible extended prefix to the bitmap of the image portion to generate the distance value. Rather, the comparator 72 merely compares the upper and lower contours of the current character of an extended prefix from the point at which the previous analysis of its parent prefix ended, as indicated by the set of starting x and y positions.

Moving one pixel column at a time, the comparator 72 compares the upper and lower contours of the current character with the bitmap, starting from the current x and y positions, to generate the distance value. For each current character, the comparator 72 records the ending x and y positions of the bitmap which generate the best comparison between the upper and lower contours and the bitmap. Alternatively, the comparator 72 could estimate the ending x and y positions from the contour and begin analyzing the bitmap up to that point. The comparator 72 will then move about the estimate point to find the best fit x and y positions. Other embodiments for the comparator 72 will be apparent to those skilled in the art.

While it is often the case that the image line will extend straight across the page, occasionally, the image line will travel upwardly, downwardly or even in a curve or spiral. Further, the absolute size of the characters of the image may change. Any one of these effects may change the relative x and y positions.

The extended prefix, or agenda entry, output from the dictionary unit, has the starting x and y positions and the starting distance measure inherited from its parent prefix updated by the current distance measure and new ending x and y positions determined by the comparator 72. The new ending x and y positions replace the starting x and y positions and the current distance measure is added to the starting distance measure to obtain the ending distance measure. This updated extended prefix is then added to the list of agenda entries stored in the agenda storage unit 74.

The contour analyzing means 70 also comprises a prefix selector 76. The prefix selector 76 selects a new list of selected prefixes from the updated agenda stored in the agenda storage unit 74. The list of selected prefixes comprises a limited number of high quality text prefixes, based on the distance values stored in the agenda storage unit 74. The selected prefixes are then used to obtain the new list of extended prefixes from the dictionary storage unit 62. These new current characters extend from the selected prefixes in the agenda by one character.

The limited number of prefixes selected by the prefix selector 76 is determined in one of two ways. In a first method, the distance value for each prefix is compared to a threshold. The prefix selector 76 then selects every text prefix whose total distance value is less than the threshold. In the second method, the prefix selector 76 selects the N text prefixes in the agenda having the best distance value, where N is some predetermined integer. Once the prefix selector 76 has identified a new list of possible text prefixes, this list is provided to the transition path extractor 64.

The contour analyzing means 70 also comprises an end-of-line determining means 78. The end-of-line determining means 78 determines if an end-of-line condition has been met by any of prefixes. The end-of-line condition is preferably a large white space at least three columns wide. The end-of-line determining means 78 outputs a stop signal whenever any prefixes meet the end-of-line condition. The stop signal is input to the agenda storage unit 74, which outputs the prefix having the best distance measure of the prefixes meeting the end-of-line condition. Of course, other embodiments for the end-of-line determining means 78 will be apparent to those skilled in the art.

In general, the contour analyzing means 70 uses a beam search method to select the list of text prefixes and the set of possible current characters based on this list. That is, the list is reorganized to contain the possible prefixes in the agenda which provide the best comparison to the current image portion being analyzed. Thus, a text prefix at one point may be dropped from the selected list because it does not generate as good a distance value as other text prefixes. However, as the image analysis continues, previously better prefixes may become worse than the dropped text prefix. In this case, the previously abandoned prefix once again is selected. Since the distance value includes not only the quality of the comparison but the x and y positions of the image contour to which the prefix extends, the contour comparator 72 may begin analyzing one selected prefix at one point in the bitmap of the image line, while it begins analyzing another text prefix at another point in the bitmap of the image line. That is, one selected prefix may contain one, two or even more characters more than in another selected prefix.

At some point, the bitmap of the image line may become white space or interword space. In the first preferred embodiment, this will be treated just like any other character. This is done because what appears as an interword space may not actually indicate an end of a word. Rather, it may be an improper spacing between characters of a single word. In addition, the interword spacing is very often highly variable, even in a single image line. Thus, the interword space, if it is to be actively used, as in the second preferred embodiment, must be arbitrarily predetermined. This arbitrariness ensures some real interword spaces to be missed, and interword spaces will be "found" where none actually exist. Thus, in the first preferred embodiment, robustness against the variability of the interword spacing is obtained by treating the interword space as merely another character. However, by incorporating some bottom-up techniques, as in the second preferred embodiment, the interword spacing can be used to indicate the end of the current image word. The prefix selector 76 will then finally select one prefix stored in the agenda storage unit 74. This finally selected prefix is the complete dictionary word which generates the lowest total distance value when its upper and lower contours are compared with the image contours. This finally selected text prefix is then output as the text word corresponding to the current portion of the current image line.

In general, the text recognition system 40 is implemented on a general purpose microcomputer. In particular, the dictionary storage unit 62 is implemented as the three-tape finite-state-machine on the general purpose microcomputer. The three tapes comprise a first tape containing possible text characters, a second tape containing the corresponding upper shape contours and a third tape containing the corresponding lower shape contours. In general, it should be appreciated that the entire state diagram for the three-tape finite-state-machine will contain paths encompassing the entire dictionary stored in the dictionary storage unit 62.

Figure 5:
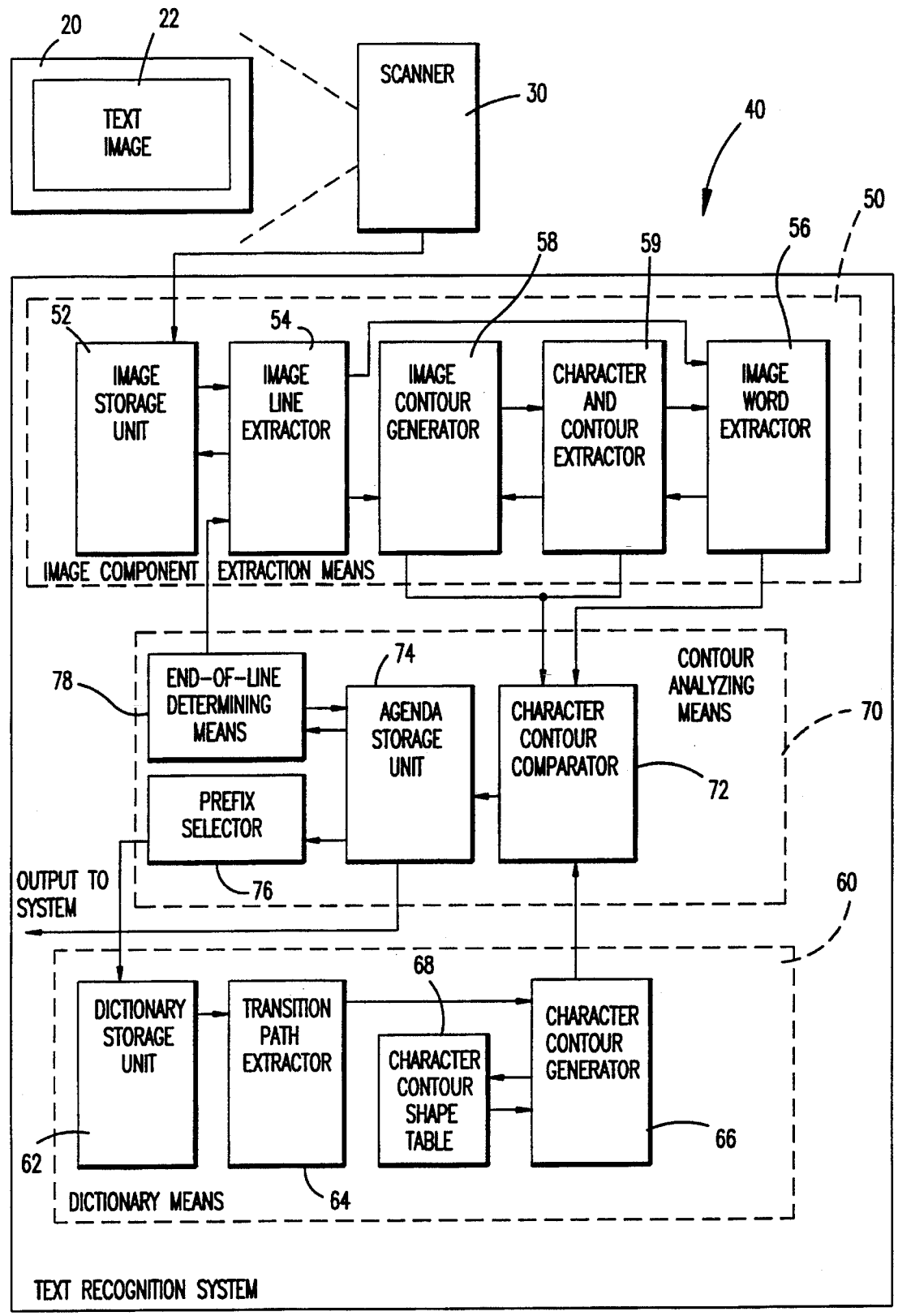
FIG. 5 is a block diagram of the third and fourth preferred embodiments of the image analyzing system.

In the third preferred embodiment of the text recognition system 40, the image line extractor 54, as shown in FIG. 5, after extracting a current line from the image, outputs the current line to an image contour generator 58. The image contour generator 58 generates an upper contour and a lower contour of the entire current line. To generate each of the upper and lower contours, the image contour generator 58 identifies a leftmost pixel of the current line and, looking at the bitmap of clean-up the line, output from the scanner, generates an upper contour and a lower contour. It should be appreciated, while the image contour generator 58 as well as the dictionary storage unit 62 uses a single contour scheme, that any number of different contour schemes will generate valid contours from the same bitmap. In general, all such contour schemes are equally valid. After the image contour generator 58 generates the upper and lower image contours for the current line, they are output to the contour analyzing means 70.

In the third preferred embodiment of the text recognition system 40, after the image contour generator 58 generates the upper and lower contours of the current image line, a character and contour extractor 59 determines the broad features of the contours for the current image portion lying between the interword spaces. These broad image features include ascenders and descenders, and concave-up and concave-down portions of the contour. By incorporating these measures of broad character class into the distance measure determination, additionally efficiencies can be generated by more quickly eliminating poor matches. However, as such character features involve analyzing the feature relative to an entire word, this also introduces additional inefficiencies involved in the entire word analysis of the known partial top-down system described above. However, as with the first and second preferred embodiments, the actual analysis continues to be performed on a left-to-right, piecewise basis.

In the fourth preferred embodiment of the text recognition system 40, as is also shown in FIG. 5, an image word extractor 56 can be inserted between the image line extractor 54 and the image contour generator 58. The operation of this fourth preferred embodiment of the text recognition system 40 is set forth in FIGS. 4A–4C. In general, the significant difference between the first, third and fourth preferred embodiments of the text recognition system 40 lie in the image contour generation 58, which determines the contours of the current image line, and the image word extractor 56, which determines a priori the interword spaces of the current image line. Thus, the third and fourth preferred embodiments of the text recognition system 40 and the flowchart shown in FIGS. 4A-4C more closely corresponds to the known partially top-down technique. However, as is clear from the flowchart set forth in FIGS. 4A– 4C, while the interword spaces are a priori determined in step S4035, the text recognition system 40 continues to analyze the image portions lying between the interword spaces on a left-to-right piecewise basis. Thus, while inefficiencies are introduced by a priori determining the interword spaces, none of the inefficiencies introduced by doing entire word contour comparisons are present. It should also be appreciated that the image word extractor 56 can be used alone, without the image contour generator 58, and connected directly to the comparator 72.

In a fifth preferred embodiment, also shown in FIG. 5, the dictionary storage unit 62 is a 1-tape finite state machine, rather than a 3tape finite-state-machine. In this embodiment, the dictionary storage unit 62 outputs only the transitions from the parent prefix which form the extended prefixes. The extended prefixes are then output to a character contour generator 66, which takes the ending transition of an extended prefix and searches a character contour shape table 68 for the corresponding upper and lower contours. The character contour generator 66 then appends the corresponding contours to the transition of the extended prefix to form the triple, and outputs the completed extended prefix to the comparator 72.

Thus, this technique solves the space and time problems mentioned above, as the dictionary is compactly encoded using known technology and the word-matching process is carried out piecewise only so long as a further match along a state-transition path is sanctioned by the existence of words in the dictionary and the overall quality of the match between the text and the image word. Thus, the process scales up to very large, even infinite dictionaries that have infinitely many words, as the time of look-up is proportional to the length of the input bitmap rather than the size of the dictionary. Additionally, this process inherently converges with other dictionary-filtering approaches, since the finite-state dictionary can represent morphological paradigms for some languages, infinite compounding patterns for others, conventions of punctuation and line breaking in even others, and ligature extensions to the alphabet to capture script or font conventions.

Furthermore, this process also solves the stretching, scaling and tilting problems. In general, the problem with standard warping techniques used to compensate in the prior art matching methods is that it is an expensive operation which must be done for all possible candidate word shapes. In the present technique, the time warping of four specific local mechanisms, to handle the four problems of character shape variation, intercharacter spacing, tilting, and word spacing, becomes a simple matter of manipulation of the three-tape finite-state machine. For example, the intraword spacing can be modeled in the three-tape finite-state machine by inserting a discrete set of epsilon (empty set) transitions of differing lengths bounded by some fraction of the interword spacing. Alternatively, tilting, such as for italics, is handled by allowing different-sized initial epsilon transitions for the upper shape and lower shape contours. Finally, character variation can be compensated for by providing alternative letter shapes, from fonts of different styles or sizes, or by doing local time warping on a per-letter basis.

Further, if an assumption can be made that the character shape warping is uniform across a line or even across an entire document, such a constant warp factor can be computed from a small sample of the document and then applied as a parameter of the matching step. Finally, the beam search filtering quickly excludes paths where matches require large variations in character shape variation, intercharacter spacing, tilting or word spacing, since the distance values for remaining letter matches will very quickly become very poor.

Finally, it should be appreciated that the search can be conducted in right-to-left and top-to-bottom directions when that is the appropriate direction for the language in the dictionary means 60. This would be necessary, for example, when analyzing a Hebrew text image or a vertically-set Japanese text image.

While the invention has been described in connection with the preferred embodiment, it will be understood that it is not intended to limit the invention to these embodiments. On the contrary, it is intended to cover all alternatives, modifications and equivalents as may be included within the spirit and scope of the invention as defined by the appended claims.

What is claimed is:

1. A method for converting an image portion to at least one text word comprising the steps of:

a) generating a bitmap of a current portion of an image, said bitmap including a leftmost pixel of the current image portion;

b) selecting a list of current possible text prefixes, the list of current possible text prefixes including at least one current possible text prefix, from a dictionary of possible text words and a list of possible text prefixes;

c) obtaining an upper prefix contour and a lower prefix contour for each current possible prefix of the list of current possible text prefixes;

d) determining a comparison value between the current image portion and each at least one current possible text prefix based solely on a comparison between the bitmap of the current image portion and the upper and lower prefix contours, said comparison value including a distance measure between the bitmap and the prefix contours representing the quality of the fit and coordinate values of the bit map of the current image portion to which the upper and lower pixel contours of each possible current text prefix extend;

e) updating said list of possible text prefixes based on the comparison value for each current possible text prefix, said updated list including at least one extended prefix selected from the dictionary;

f) updating the list of current possible text prefixes from the updated list of possible text prefixes based on the distance measure corresponding to each prefix on the updated list of possible text prefixes;

g) repeating steps c–f until an end of the current image portion has been reached; and h) identifying a best one of the possible text prefixes as the text word corresponding to the current image portion.

2. The method of claim 1, wherein the step of selecting the list of current possible text prefixes comprises the steps of:

searching the dictionary of possible text words, the dictionary, containing a list of valid text words;

selecting each current possible text prefix corresponding to an initial text prefix of at least one valid text word to form the list of possible text prefixes.

3. The method of claim 1, wherein the step of updating the list of possible text prefixes comprises replacing the list of possible text prefixes with the at least one extended text prefix.

4. The method of claim 1, wherein the step of updating the at least one possible text prefixes comprises adding the list of extended text prefix to the list of possible text prefixes.

5. The method of claim 4, wherein the step of updating further comprises deleting the list of selected text prefixes from the list of possible text prefixes.

6. The method of claim 1, wherein the selecting step comprises selecting at least one text prefix from the list of possible text prefixes having a comparison value better than a predetermined threshold comparison value.

7. The method of claim 1, wherein the selecting step comprises selecting a predetermined number of text prefixes having best comparison values from the list of possible text prefixes.

8. The method of claim 1, wherein the determining step further comprises the steps of:

generating an upper image contour and a lower image contour of the current image portion;

matching the upper and lower contours of the list of current possible text prefixes to the upper and lower image contours; and deleting current possible text prefixes having a poor match to the upper and lower image contours from the list of corresponding text words.

9. The method of claim 1, wherein the identifying step comprises selecting a text prefix from the list of possible text prefixes having a comparison value indicating a best match between the upper and lower contours of the text prefix and the bitmap of the current image portion.

10. The method of claim 1, wherein the current image portion is a current image line.

11. The method of claim 10, wherein the current image portion is a current image word of the current image line.

12. The-method of claim 1, wherein the comparison value determining step comprises the steps of:

determining extended portions for each of the upper and lower prefix contours for each current possible text prefix; and comparing the extended portions of each of the upper and lower contours of each current possible text prefix to a corresponding portion of the bitmap of the current image portion based on the corresponding coordinate values.

13. A method for converting a selected portion of an image on a document to a list of text characters, comprising the steps of:

(a) converting the image to an image bitmap;

(b) selecting a portion of the image bitmap as a current portion;

(c) identifying a leftmost pixel of the current portion as a current pixel for each text prefix;

(d) generating a list of possible prefixes corresponding to the current portion, the list initially comprising only a start prefix;

(e) selecting a list of best possible prefixes from the list of possible prefixes;

(f) inputting one of the list of best possible prefixes to a dictionary of possible text words as a current selected prefix;

(g) generating a list of extended possible prefixes from the dictionary from the current selected prefix;

(h) selecting one of the list of extended possible prefixes as a current extended prefix;

(i) obtaining an upper contour and a lower contour for the current extended prefix;

(j) comparing upper and lower contours of the current extended prefix to the current portion of the bitmap starting from the current pixel for the selected extended prefix and calculating a comparison value based on a distance measure between the bitmap and the upper and lower contours derived from the comparison;

(k) storing each current extended prefix to the list of possible prefixes;

(l) repeating steps g–j until each extended possible prefix is selected;

(m) repeating steps f–l until each best possible prefix is selected;

(n) repeating steps e–m until at least one possible prefix meets an end of portion condition;

(o) identifying a best one of the at least one possible prefix meeting the end of portion condition; and (p) repeating steps b–o until each portion of the image is selected.

14. A method for converting an image portion to at least one text word comprising the steps of:

a) generating a bitmap of a current portion of an image, said bitmap including a leftmost pixel of the current image portion;

b) selecting a list of current possible text prefixes, the list of current possible text prefixes including at least one current possible text prefix, from a dictionary of possible text words and a list of possible text prefixes;

c) obtaining an upper prefix contour and a lower prefix contour for each current possible prefix of the list of current possible text prefixes;

d) determining a comparison value including a distance measure representing the quality of the fit between the current image portion and the contours of the current possible text prefix, wherein determining comprises the steps of:

comparing the upper contour for each at least one current possible text prefix to the bitmap of the current image portion to generate a first comparison value, comparing the lower contour for each at least one current possible text prefix to the bitmap of the current image portion to generate a second comparison value, and combining for each current possible text prefix, the corresponding first and second comparison values to form the corresponding comparison value;

e) updating said list of possible text prefixes based on the comparison value for each current possible text prefix, said updated list including at least one extended prefix selected from the dictionary;

f) updating the list of current possible text prefixes from the updated list of possible text prefixes based on the distance measure corresponding to each prefix on the updated list of possible text prefixes;

g) repeating steps c–f until an end of the current image portion has been reached; and h) identifying a best one of the possible text prefixes as the text word corresponding to the current image portion.

* * * * *